(12) United States Patent
Raghunandan

(10) Patent No.: US 7,814,162 B2
(45) Date of Patent: *Oct. 12, 2010

(54) SELF-PROTECTING E-MAIL

(75) Inventor: Hulikunta Prahlad Raghunandan, Maharashtra (IN)

(73) Assignee: International Business Machines Corporation, Armonk, NY (US)

( * ) Notice: Subject to any disclaimer, the term of this patent is extended or adjusted under 35 U.S.C. 154(b) by 725 days.

This patent is subject to a terminal disclaimer.

(21) Appl. No.: 11/593,849

(22) Filed: Nov. 7, 2006

(65) Prior Publication Data

US 2007/0055735 A1    Mar. 8, 2007

Related U.S. Application Data

(63) Continuation-in-part of application No. 09/643,443, filed on Aug. 22, 2000, now Pat. No. 7,136,897.

(51) Int. Cl.
*G06F 15/16* (2006.01)

(52) U.S. Cl. ...................................... 709/206

(58) Field of Classification Search ............... 709/206, 709/213–219; 711/E12.089
See application file for complete search history.

(56) References Cited

U.S. PATENT DOCUMENTS 5,506,872 A * 4/1996 Mohler ........................ 375/240
7,107,274 B2 * 9/2006 Sekiguchi et al. ............ 707/100
7,343,356 B2 * 3/2008 Prahlad et al. ............... 705/400
7,406,505 B2 * 7/2008 Keohane et al. .............. 709/206
2006/0031305 A1 * 2/2006 Keohane et al. .............. 709/206
2008/0052324 A1 * 2/2008 Choubey et al. ............. 707/201
2008/0071865 A1 * 3/2008 Dutta ........................... 709/206

* cited by examiner

*Primary Examiner*—J Bret Dennison
(74) *Attorney, Agent, or Firm*—Anthony V S England; William Steinberg

(57) ABSTRACT

Local capacity threshold values for a user e-mailbox and costs are stored for overflow storage devices accessible on a network. The costs provided a ranking of the overflow storage devices. E-mail's are processed responsive to increases in accumulated storage of the e-mails beyond the respective local capacity threshold values to reduce storage space of the e-mails. An e-mail is received that increases the accumulated storage volume of the user's e-mails beyond the maximum local capacity threshold value. A subset of the overflow storage devices is selected by reference to the costs. One of the overflow storage devices of the subset is selected responsive to availability of storage space on the overflow storage devices of the subset and cost ranking among the overflow storage devices of the subset. The received e-mail is sent for storing on the selected overflow storage device, instead of storing the received e-mail in the user's e-mailbox.

21 Claims, 3 Drawing Sheets

SELF-PROTECTING E-MAIL

CROSS REFERENCE TO RELATED APPLICATION

This is a continuation-in-part of application Ser. No. 09/643,443 now U.S. Pat. No. 7,136,897, filed Aug. 22, 2000, which is hereby incorporated herein by reference.

FIELD OF THE INVENTION

The present invention relates generally to controlling storage of electronic mail ("e-mail"), with particular emphasis on issues about storage space at a user's mailbox (also referred to herein as an "e-mailbox").

BACKGROUND

Today in spite of the fact that resources (like CPU power and disk space) are cheaper than before, increasing e-mail usage and the unpredictability associated with its size and volume can be very costly to individuals and corporations alike. E-mail is now a very commonly used way of sending and receiving information. E-mail may be sent between users on a local area network or a wide area network across the Internet for example. E-mail usage continues to increase, and it is not uncommon for an e-mail user to receive many hundreds of messages in a day. Many of these messages may themselves have lengthy attachments which need a great deal of storage space, such as graphics files. In addition, there is growth in volume of spam mail which is unsolicited (predominantly unwanted) e-mail, and which also serves to fill up a user's mailbox. When a mailbox runs out of user space to store incoming mail, existing e-mail systems simply then bounce the mail back to the sender indicating that this mail was not delivered. There is, however, no way that the receiver knows that a mail delivery failed. Thus, an important e-mail could be missed, and the receiver does not know this. This could have potentially disastrous consequences in business for example. In cases where the mail sent is large in size (perhaps due to attachments) the e-mail software does not deliver mail if the user space available is less than the mail size even if the amount of user space available is substantial.

SUMMARY

The present invention addresses the foregoing problems. Local capacity threshold values for a user e-mailbox and costs are stored for overflow storage devices accessible on a network. The costs provide a ranking of the overflow storage devices. E-mail's are processed responsive to increases in accumulated storage of the e-mails beyond the respective local capacity threshold values to reduce storage space of the e-mails. An e-mail is received that increases the accumulated storage volume of the user's e-mails beyond the maximum local capacity threshold value. A subset of the overflow storage devices is selected by reference to the costs. One of the overflow storage devices of the subset is selected responsive to availability of storage space on the overflow storage devices of the subset and cost ranking among the overflow storage devices of the subset. The received e-mail is sent for storing on the selected overflow storage device, instead of storing the received e-mail in the user's e-mailbox.

More specifically, in one form of the invention, a method for storing e-mail includes storing local capacity threshold values for a user e-mailbox hosted on a local server, including a maximum local capacity threshold value. Likewise, costs are stored for overflow storage devices (also referred to herein as "e-mail reservoirs"). The overflow storage devices are accessible on a network and are referred to as "remote" from the local server, although this term is merely for convenience and is not intended to necessarily imply distance. The costs provide a ranking from a least costly to a most costly overflow storage device. E-mail's of the user are processed responsive to increases in accumulated storage volume of the e-mails beyond the respective local capacity threshold values. The processing reduces storage space of the e-mails for the e-mailbox.

An e-mail is received that increases the accumulated storage volume of the user's e-mails beyond the maximum local capacity threshold value. A subset of the overflow storage devices is selected by reference to the stored costs, such that the overflow storage devices of the subset have lesser costs than the remainder of the overflow storage devices, i.e., the non-selected ones.

One of the overflow storage devices of the subset is selected responsive to availability of storage space on the overflow storage devices of the subset and responsive to cost ranking among the overflow storage devices of the subset. The received e-mail is sent for storing on the selected overflow storage device, instead of storing the received e-mail in the user's e-mailbox.

In another aspect of the invention, the method includes polling for availability of space on the subset of the overflow storage devices, where the availability of storage space on the overflow storage devices is indicated by results of the polling.

In another aspect of the invention, the method includes polling the user's local e-mailbox for the selected overflow storage device if e-mail for the user's local mailbox is stored on the selected overflow storage device. The polling of the user's e-mailbox includes polling for availability of space in the user's e-mailbox.

In another aspect of the invention, the method includes moving e-mail to the user's local e-mailbox and removing the moved e-mail from the selected overflow storage device responsive to results of the local e-mailbox polling.

In another aspect of the invention, the method includes compressing the e-mail sent for storing on the selected overflow storage device.

In another aspect of the invention, the method includes computing the overflow storage device costs responsive to i) capacities of the respective overflow storage devices and ii) network logical distances between the local server and the respective remote overflow storage devices.

In another aspect of the invention, the method includes charging the user a storage charge for storing the user's e-mail on the selected overflow storage device, wherein the storage charge is responsive to i) time the user's e-mail is stored on the selected overflow storage device, ii) storage space used for storing the user's e-mail on the selected overflow storage device, or both i) and ii).

In another form of the invention, a computer system includes a processor and a storage device connected to the processor. The storage device has stored thereon an e-mail storage management program for controlling the processor. The processor is operative with the program to execute the program for performing the above described method in whole, or in part.

In another form of the invention, a computer program product is stored on a tangible, computer readable medium, for managing e-mail storage. The computer program product has instructions for execution by a computer. When executed by the computer the instructions cause the computer to implement the above described method in whole, or in part.

DETAILED DESCRIPTION OF PREFERRED EMBODIMENTS OF THE INVENTION

In the following detailed description of the preferred embodiments, reference is made to the accompanying drawings illustrating embodiments in which the invention may be practiced. It should be understood that other embodiments may be utilized and changes may be made without departing from the scope of the present invention. The drawings and detailed description are not intended to limit the invention to the particular form disclosed. On the contrary, the intention is to cover all modifications, equivalents and alternatives falling within the spirit and scope of the present invention as defined by the appended claims. Headings herein are not intended to limit the subject matter in any way.

Figure 1:
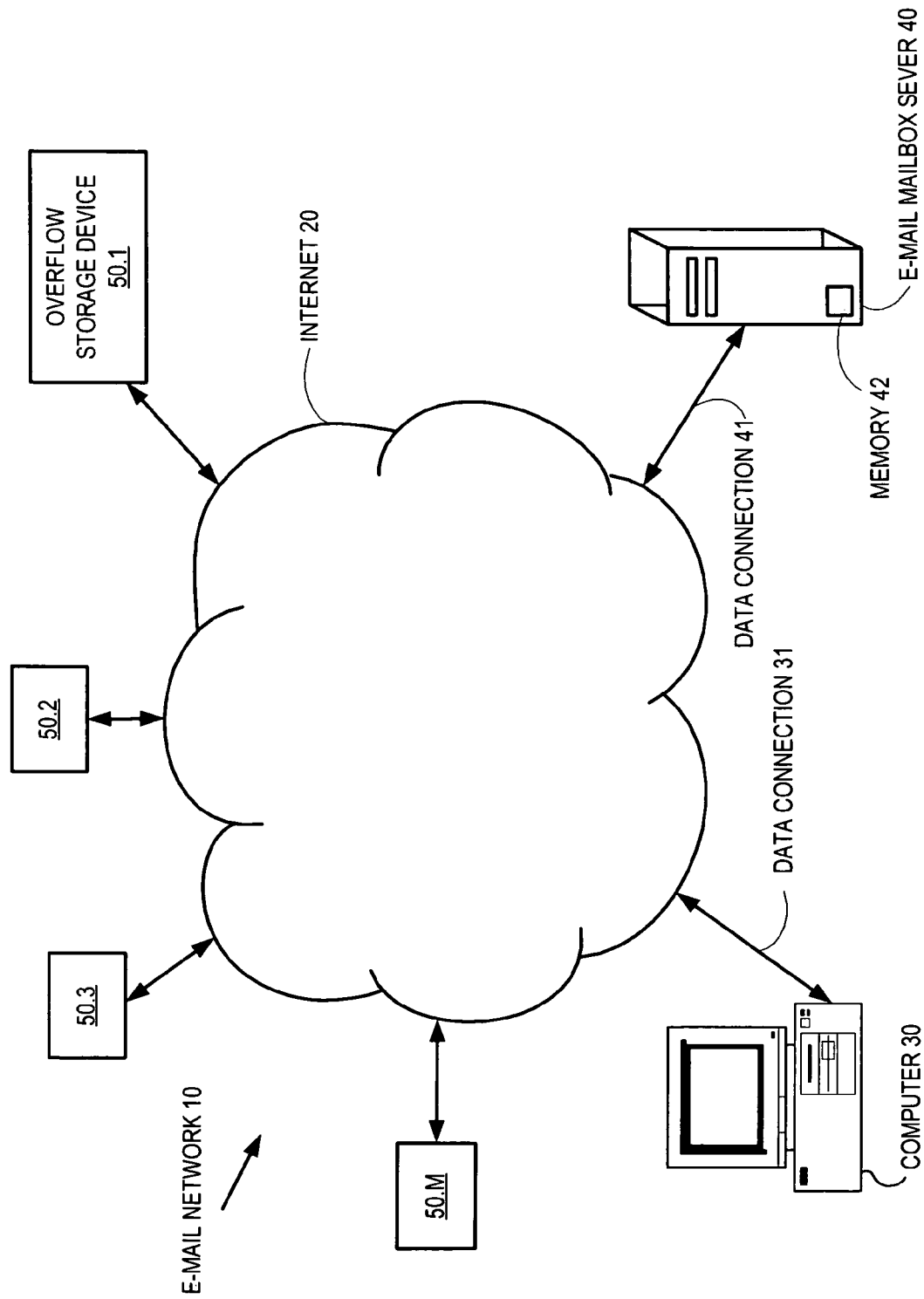
FIG. 1 illustrates a computer e-mail network, according to an embodiment of the present invention.

Referring now to FIG. 1, computer e-mail network 10 includes a client computer 30 in communication with an e-mailbox server 40 over the Internet 20 via data connections 31 and 41. Data connection 31 may be a dial-up connection or a permanent ('always-on') connection. While network 10 in the illustrated embodiment includes the Internet 20, it does not necessarily have to.

E-mail server 40 generally allocates a maximum amount of memory 42 (for example, 100 MB or even merely 10 MB) for e-mailboxes of respective users. (Due to the benefits of the present invention, the amount of memory that is allocated for each e-mailbox may typically be reduced.) Once a connection to an ISP is established, the user (not shown) at computer 30 can request access via data connection 41, Internet 20 and data connection 31 to e-mail messages currently stored in their e-mailbox (not shown) in memory 42, which may include downloading the messages to computer 30.

Downloaded messages received at computer 30 are decoded in a conventional manner by a client e-mail program, which may be a proprietary program, such as Microsoft Outlook or Lotus Notes, or an open source program, such as Mozilla Thunderbird. In a preferred system, the mailbox is continuously and dynamically assessed to determine the level of user mailbox storage space remaining within server 40. This level is continually checked by server 40 and is represented by an updated level indicator stored in memory 42 in server 40. Advantageously, the user can pre-set various threshold levels that are also stored in the memory in server 40. Alternatively, these levels can be set by server 40, or by the ISP, or otherwise. These pre-set threshold levels determine which of the processing steps as shown in the flowchart of FIG. 2 are executed, and are chosen to meet the user's requirements.

Figure 2:
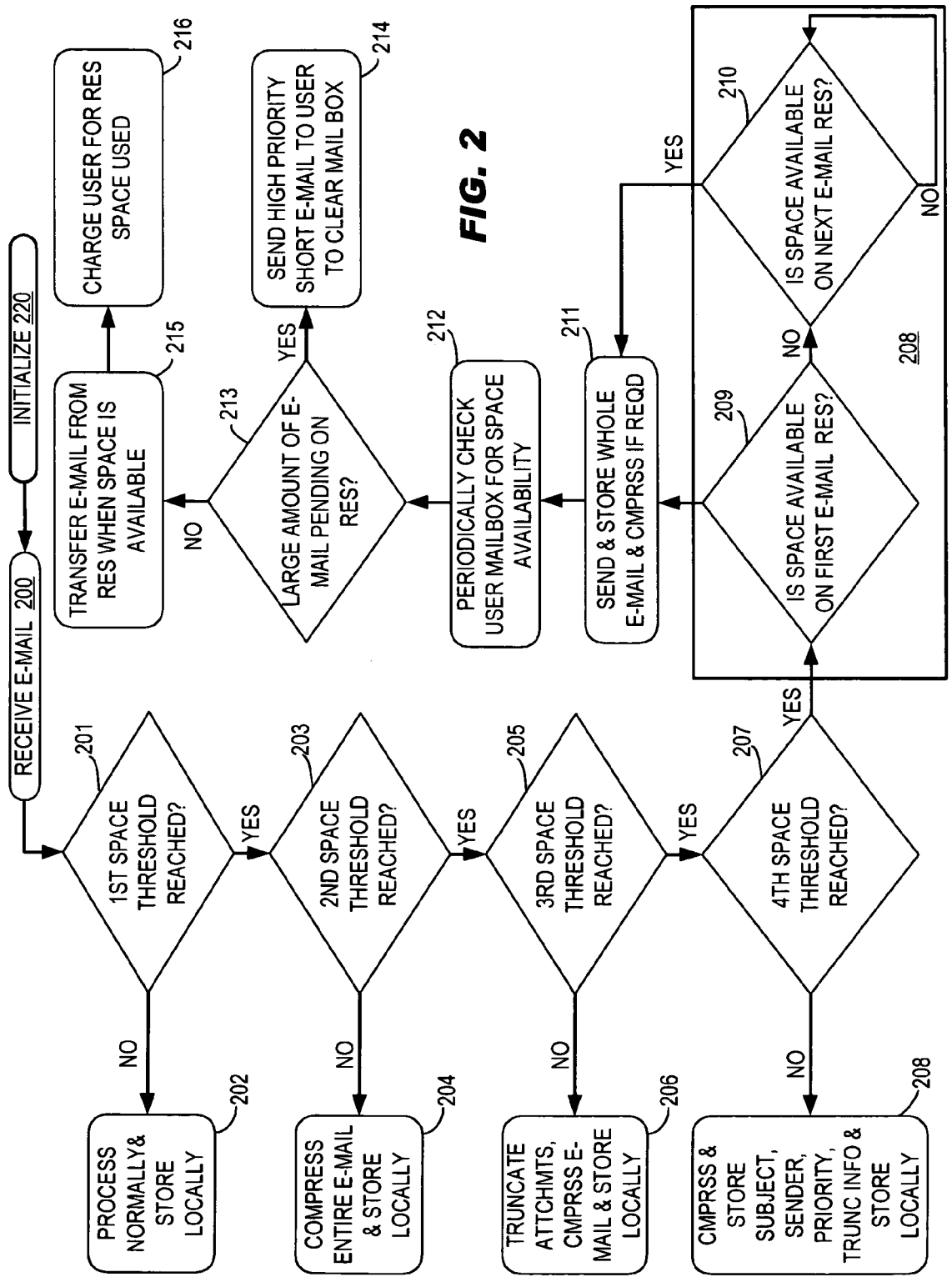
FIG. 2 illustrates a method of controlling storage for an e-mailbox, according to an embodiment of the present invention.

Referring now to FIG. 2 in connection with FIG. 1, responsive to inadequate storage space on server 40 for a user's e-mailbox, received e-mails may be individually "sprayed," i.e., sent on network 10 to various e-mail reservoirs 50.1, 50.2, 50.3, etc., through 50.M, e.g., storage servers. That is, when there is inadequate space for a received e-mail message, one of the storage devices 50.1, 50.2, 50.3, etc. is selected for storage of the received e-mail based on a cost, which may include cost factors relating transfer and/or capacity cost of a recipient e-mail reservoir.

More specifically, server 40 initially receives 200 an e-mail message for a user and then compares a current level indicator, which indicates the amount of e-mail storage space currently in use, to a first threshold level 201 pre-set by the user. Threshold level 201 is, for example, a proportion of the total available e-mailbox space allocated to that user on server 40. If first threshold 201 has not been exceeded, then server 40 locally stores 202 the full incoming e-mail message in e-mailbox of memory 42, and any attachments, in a conventional manner. If, however, threshold 201 has been reached or exceeded, then server 40 compares 203 the current level indicator with second threshold level 203.

If second threshold 203 has not been exceeded, server 40 compresses 204 the incoming e-mail, including any attachments, using a known data compression program, for example a zip type program, and the compressed version is stored in the e-mailbox for future retrieval. In circumstances where second threshold 203 has been exceeded, server 40 compares 205 the level indicator with third threshold level 205.

When the first and the second, but not the third, thresholds have been exceeded, server 40 compresses and stores 206 in e-mailbox of memory 42 only the message portion of the e-mail. Any attachments are returned to the sender in the conventional manner. If third threshold 205 has been exceeded, server 40 compares 207 the level indicator with a fourth threshold level 207.

If fourth threshold 207 has not been exceeded, in addition to truncation of attachments, the body contents of the e-mail are truncated 208 and only data concerning the e-mail is stored in e-mailbox of memory 42. This data may comprise, for example, information regarding the sender, path taken by the message, date/time, subject, priority, number of attachments and/or number of bytes of body content that was truncated.

Of course, the above described processing of a received e-mail may be done repeatedly, wherein such processing occurs responsive to each receipt by server 40 of an e-mail. Thus, in the context of such repeated processing it should be appreciated that the above has described processing e-mails of the user responsive to increases in accumulated storage volume of the e-mails beyond the respective first 201, second 203, and third 205 local capacity threshold values, wherein the processing reduces storage space of the e-mails for the e-mailbox.

Also according to the illustrated method, e-mail server 40 is initialized 220 with a stored data structure that indicates addresses for e-mail reservoirs 50.1, 50.2, 50.3, etc., through 50.M. This initialization 220 may be by an administrator or a user, or may be performed automatically by e-mail server 40 in connection with automatically discovering such storage devices 50.1, 50.2, etc., on network 10 according to a predetermined protocol. Likewise, costs associated with accessing respective e-mail reservoirs 50.1, 50.2, etc. from a user e-mailbox on server 40 are initialized 220 and stored as a data structure in memory 42 of e-mail server 40. Initialization 220 of these costs may also be performed by an administrator or a user or automatically by e-mail server 40. This may include server 40 polling storage devices 50.1, 50.2, etc. to determine network logical distances between local server 40 and respective remote e-mail reservoirs 50.1, 50.2, etc. and computing costs as a function of those logical distances. It may also include server 40 polling storage devices 50.1, 50.2, etc. to determine their respective storage capacities (total or currently available) and computing costs as a function of those capacities. Server 40 may compute costs as a function of both the capacities and the distances, and may also include other factors in the computation.

Although FIG. 2 indicates, and the above paragraph describes, processes as initialization 220, it should be understood that these processes may include updating the number and addresses of e-mail reservoirs 50.1, 50.2, 50.3, etc., and the costs associated with the respective e-mail reservoirs 50.1, 50.2, 50.3, etc.

An exemplary matrix cost data structure is illustrated in Table One below, in which rows represent respective users $u_1$, $u_2, \ldots, u_n$ of respectively different e-mail servers 40 (only one being shown in FIG. 1) and columns represent respective e-mail reservoirs $e_1, e_2, \ldots, e_m$ in network 10. Accordingly, each cell of the matrix, which is indexed by a row and column, indicates a cost of accessing the e-mail reservoir 50.1, 50.2, 50.3, etc., of that cell's column from that user's e-mailbox. Of course, for an arrangement in which there is only a single server 40, as shown in FIG. 1, the matrix has only a single row $u_1$.

TABLE ONE

|       | $e_1$    | $e_2$    | $e_3$    | $e_m$    |
|-------|----------|----------|----------|----------|
| $u_1$ | $c_{11}$ | $c_{21}$ | $c_{31}$ | $c_{1m}$ |
| $u_2$ | $c_{21}$ | $c_{22}$ | $c_{23}$ | $c_{2m}$ |
| $u_3$ | $c_{31}$ | $c_{32}$ | $c_{33}$ | $c_{3m}$ |
| $u_n$ | $c_{n1}$ | $c_{n2}$ | $c_{n3}$ | $c_{nm}$ |

Returning to FIG. 2, it may occur that the received e-mail increases the accumulated storage volume of the user's e-mails for the user's e-mailbox of server 40 beyond the maximum local capacity threshold value of fourth threshold 207. This may happen, for example, because the users have not cleared their mail boxes or have received an unprecedented large volume of e-mail. If fourth threshold 207 has been exceeded, server 40 performs process 208.

In FIG. 2, certain details of process 208 for an embodiment of the invention are not explicitly shown. In particular, process 208 may also include selecting, by reference to the stored costs (Table One, initialization 220), a subset of e-mail reservoirs 50.1, 50.2, 50.3, etc. having lesser costs than non-selected ones of the e-mail reservoirs 50.1, 50.2, 50.3, etc. (In the illustrated instance, two e-mail reservoirs among all e-mail reservoirs 50.1, 50.2, 50.3, etc. are selected as the subset, i.e., first e-mail reservoir 209 and second e-mail reservoir 210.) Further, process 208 may also include selecting one of the e-mail reservoirs 50.1, 50.2, 50.3, etc. of the subset responsive to cost ranking among the e-mail reservoirs of the subset. Thus, it should be understood that first e-mail reservoir 209 is in its position as first because it was selected as the least costly reservoir among e-mail reservoirs 50.1, 50.2, 50.3, etc. and second e-mail reservoir 210 is in its position as second because it was selected as the next least costly reservoir among e-mail reservoirs 50.1, 50.2, 50.3, etc.

In addition, process 208 includes polling the subset of e-mail reservoirs 50.1, 50.2, 50.3, etc. for availability of storage space, so that availability of storage space on the e-mail reservoirs 50.1, 50.2, 50.3, etc. is indicated by results of the polling. (In FIG. 2, this is illustrated as first e-mail reservoir polling 209 and second e-mail reservoir polling 210.) Accordingly, in process 208 server 40 also selects one of the e-mail reservoirs 50.1, 50.2, 50.3, etc. of the subset responsive to availability of storage space on the e-mail reservoirs of the subset. That is, if polling indicates first e-mail reservoir 209, which is the least costly, has space available, then this e-mail reservoir is selected. If not, then if polling indicates second e-mail reservoir 210, which is the next least costly, has space available, then this e-mail reservoir is selected.

Next, server 40 sends 211 the received e-mail for storing on the selected one of e-mail reservoirs 50.1, 50.2, 50.3, etc., i.e., e-mail reservoir, instead of storing the received e-mail in the user's e-mailbox. The selected, available e-mail reservoir 50.1, 50.2, 50.3, etc. stores 211 the e-mail using standard compression if necessary and/or opted for. This compression may be done by server 40 before sending, or it may be done by the recipient one of e-mail reservoirs 50.1, 50.2, 50.3, etc.

Since the received e-mail is now stored on an e-mail reservoir 50.1, 50.2, 50.3, etc., server 40 or the e-mail reservoir 50.1, 50.2, 50.3, etc. that temporarily has the received e-mail stored thereon polls 212 the user's local mailbox at intervals to check for availability of space. If space is available, server 40 moves 215 e-mail to the user's local mail box (and removes it from the e-mail reservoir). If the amount of a user's e-mail stored on an e-mail reservoir exceeds a certain predetermined threshold level for the e-mail reservoir, then the e-mail reservoir notifies 213 server 40 of this and server 40 prompts the user.

In one embodiment of the invention, the user is sent a storage charge 216 by the selected e-mail reservoir for storing the user's e-mail. The storage charge is determined by, i.e., is responsive to, i) time the user's e-mail is stored on the selected e-mail reservoir, ii) storage space used for storing the user's e-mail on the selected e-mail reservoir, or both i) and ii).

Privacy and security of e-mails in such a setup is well taken care of using standard privacy and security measures that are available for mail servers. Standard encryption techniques are used to ensure security.

In the above embodiment, threshold levels are as follows:

| First threshold:  | 85% full |
|-------------------|----------|
| Second threshold: | 90% full |
| Third threshold:  | 95% full |
| Fourth threshold: | 99% full |

The above described threshold levels are purely notional. Levels may be set by a user as required.

To reiterate regarding the example above, when the user disk space is 85% full, server 40 issues a message to the user stating that data compression will be applied to any future e-mails until the user either alters threshold levels, or reduces the amount of stored data to a level below the 85% full threshold. In this way, the user has control over the manner in which his or her storage space is used. Similarly, a message may be issued to a user as each threshold is reached. When the fourth threshold has been exceeded, meaning there is a shortage of local storage space, then server 40 distributes e-mails as a whole, i.e., non-truncated, to the pre-designated e-mail reservoirs on network 10. Server 40 periodically polls the user. If storage space is found in the user's local mail boxes or folders, server 40 automatically transfers the appropriate e-mails to the user. If the user has received an e-mail that is large in size/volume, the user will be informed/prompted to purge his/her mailbox and gear up to receive all other pending mail.

The description of the present embodiment has been presented for purposes of illustration, but is not intended to be exhaustive or to limit the invention to the form disclosed. Many modifications and variations will be apparent to those of ordinary skill in the art. For example, the processes of the present invention are capable of being distributed in the form of a computer readable medium of instructions executable by a processor to perform a method, i.e., process, such as described herein above. Such computer readable medium may have a variety of forms. The present invention applies equally regardless of the particular type of signal bearing media actually used to carry out the distribution. Examples of tangible computer readable media include recordable-type media such a floppy disk, a hard disk drive, a RAM, and CD-ROMs. Examples of transmission-type media include digital and analog communications links. In other words, as the term "recordable-type computer readable medium" (or, more simply, "recordable computer readable medium") is used herein, the term is not a communications link, i.e., not a signal, but rather is limited to a storage device, such as a floppy disk, hard disk, RAM or ROM.

Various embodiments implement the one or more software programs in various ways, including procedure-based techniques, component-based techniques, and/or object-oriented techniques, among others. Specific examples include XML, C, C++ objects, Java and commercial class libraries. Those of ordinary skill in the art will appreciate that the hardware depicted herein may vary depending on the implementation. The depicted example is not meant to imply architectural limitations with respect to the present invention.

Figure 3:
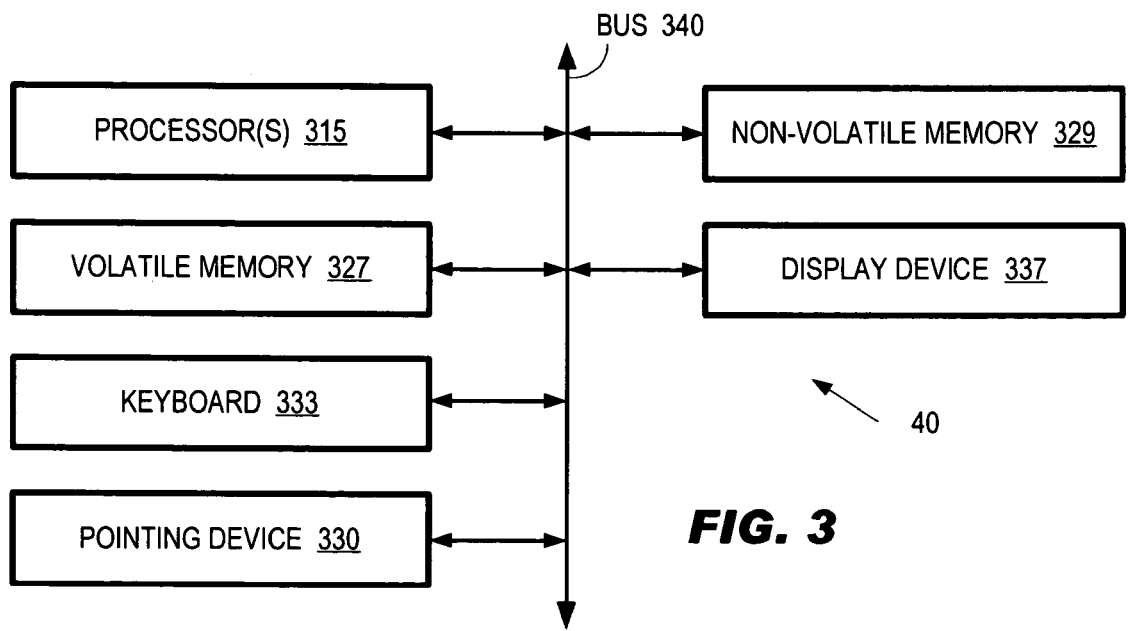
FIG. 3 illustrates a computer system in which at least aspects of the method of FIG. 2 may be practised, according to an embodiment of the present invention.

Referring now to FIG. 3, illustrates server 40 of FIG. 2 with particular emphasis on certain hardware aspects, according to an embodiment of the present invention. Server 40 takes the form of a computer system. While the above refers to controlling e-mail storage for an e-mailbox at server 40, the invention is equally applicable to controlling e-mail storage for an e-mailbox at essentially any computer system handling e-mail, including client computer system 30, a PDA, or even on a mobile telephone or other terminal. It should be understood that the term "computer system" is intended to encompass any device having a processor that executes instructions from a memory medium, regardless of whether referred to in terms of a microcontroller, personal computer system, mainframe computer system, workstation, or in some other terminology. Computer system 40 includes processor or processors 315, a volatile memory 327, e.g., RAM and a nonvolatile memory 329. Memories 327 and 329 store program instructions (also known as a "software program"), which are executable by processors 315, to implement various embodiments of a software program in accordance with the present invention. Processor or processors 315 and memories 327 and 329 are interconnected by bus 340. An input/output adapter (not shown) is also connected to bus 340 to enable information exchange between processors 315 and other devices or circuitry. System 40 also includes a keyboard 333, pointing device 330, e.g., mouse, and a display device 337.

In the illustrated embodiment, nonvolatile memory 329 includes a number of disks for data storage and another disk used for an operating system, software applications, and workloads. In other embodiments, the operating system may be on multiple disks or on some other nonvolatile store, not necessarily a disk. In another embodiment, the operating system may even be programmed in specialized chip hardware. Memory 329 also includes ROM, which is not shown, and may include other devices, which are also not shown, such as tapes.

The storing of data referred to herein above may be performed by one or more computer system processes and may include storing in a memory, such as memory 327 or 329, of the same computer system 40 on which the process is running or on a different computer system.

It should be appreciated from the foregoing that the present invention provides numerous useful benefits, including the following:

a. Individual users need not have exorbitant e-mail storage space which may largely remain unused.
b. Optimal sharing of storage space in a networked organization. Rather than allow each user to have more e-mail storage space which may largely remain unused for many users, it is better to use e-mail reservoirs which will ensure optimal usage of space.
c. Mobile users and users with hand-held devices can benefit by accessing large amount of mail economically and conveniently.
d. A more user-friendly method of dealing with mail when the user has no storage space available. Ordinarily e-mail is bounced back to the sender when a user has no space for it. The teaching herein provides a viable alternative in which the user may still receive the e-mail. This beneficial aspect of the present invention gives rise to the term "self-protecting" that is used herein.

Herein above, or in the following claims, the term "comprises" is synonymous with "includes." The use of terminology such as "X comprises A, B and C" is not intended to imply that A, B and C are necessarily the only components or most important components of X in every sense.

Unless clearly and explicitly stated, the claims that follow are not intended to imply any particular sequence of actions. The inclusion of labels, such as a), b), etc. or i), ii), etc., for portions of the claims does not, by itself, imply any particular sequence, but rather is merely to facilitate reference to the portions or to more easily identify the portions in a list.

To reiterate, the embodiments were chosen and described in order to best explain the principles of the invention, the practical application, and to enable others of ordinary skill in the art to understand the invention. Various other embodiments having various modifications may be suited to a particular use contemplated, but may be within the scope of the present invention.

What is claimed is:

1. A method for storing e-mail comprising:
storing local capacity threshold values for a user e-mailbox hosted on a local server, including a first local capacity threshold level, a second local capacity threshold level and a maximum local capacity threshold value;
storing costs for overflow storage devices remote from the local server and accessible on a network, wherein the costs provide a ranking from a least costly to a most costly overflow storage device;
receiving an e-mail that increases the accumulated storage volume of the user's e-mails beyond the first local capacity threshold level and responsively compressing subsequent incoming e-mail subsequent to the first local capacity threshold level being exceeded;
receiving an e-mail that increases the accumulated storage volume of the user's e-mails beyond the second local capacity threshold level and responsively truncating any attachments of incoming e-mail subsequent to the second local capacity threshold level being exceeded, in addition to e-mail messages being compressed and stored;
processing e-mails of the user responsive to increases in accumulated storage volume of the e-mails beyond the respective local capacity threshold values, wherein the processing reduces storage space of the e-mails for the e-mailbox;

receiving an e-mail that increases the accumulated storage volume of the user's e-mails beyond the maximum local capacity threshold value;

selecting, by reference to the stored costs, a subset of the overflow storage devices having lesser costs than non-selected ones of the overflow storage devices;

selecting one of the overflow storage devices of the subset responsive to availability of storage space on the overflow storage devices of the subset and responsive to cost ranking among the overflow storage devices of the subset; and sending the received e-mail for storing on the selected overflow storage device, instead of storing the received e-mail in the user's e-mailbox.

2. The method of claim 1, comprising:
polling for availability of space on the subset of the overflow storage devices, wherein the availability of storage space on the overflow storage devices is indicated by results of the polling.

3. The method of claim 1, comprising:
polling the user's local e-mailbox for the selected overflow storage device if e-mail for the user's local mailbox is stored on the selected overflow storage device, wherein the polling of the user's e-mailbox includes:
polling for availability of space in the user's e-mailbox.

4. The method of claim 2 comprising:
moving e-mail to the user's local e-mailbox and removing the moved e-mail from the selected overflow storage device responsive to results of the local e-mailbox polling.

5. The method of claim 1, comprising:
compressing the e-mail sent for storing on the selected overflow storage device.

6. The method of claim 1, comprising:
computing the overflow storage device costs responsive to i) capacities of the respective overflow storage devices and ii) network logical distances between the local server and the respective remote overflow storage devices.

7. The method of claim 1, comprising:
charging the user a storage charge for storing the user's e-mail on the selected overflow storage device, wherein the storage charge is responsive to i) time the user's e-mail is stored on the selected overflow storage device, ii) storage space used for storing the user's e-mail on the selected overflow storage device, or both i) and ii).

8. A computer program product, stored on a tangible, recordable-type computer readable medium, for managing e-mail storage, said computer program product having instructions for execution by a computer, which, when executed by the computer, cause the computer to implement a method comprising the steps of:
storing local capacity threshold values for a user e-mailbox hosted on a local server, including a first local capacity threshold level, a second local capacity threshold level and a maximum local capacity threshold value;
storing costs for overflow storage devices remote from the local server and accessible on a network, wherein the costs provide a ranking from a least costly to a most costly overflow storage device;
receiving an e-mail that increases the accumulated storage volume of the user's e-mails beyond the first local capacity threshold level and responsively compressing subsequent incoming e-mail subsequent to the first local capacity threshold level being exceeded;
receiving an e-mail that increases the accumulated storage volume of the user's e-mails beyond the second local capacity threshold level and responsively truncating any attachments of incoming e-mail subsequent to the second local capacity threshold level being exceeded, in addition to e-mail messages being compressed and stored;
processing e-mails of the user responsive to increases in accumulated storage volume of the e-mails beyond the respective local capacity threshold values, wherein the processing reduces storage space of the e-mails for the e-mailbox;
receiving an e-mail that increases the accumulated storage volume of the user's e-mails beyond the maximum local capacity threshold value;
selecting, by reference to the stored costs, a subset of the overflow storage devices having lesser costs than non-selected ones of the overflow storage devices;
selecting one of the overflow storage devices of the subset responsive to availability of storage space on the overflow storage devices of the subset and responsive to cost ranking among the overflow storage devices of the subset; and
sending the received e-mail for storing on the selected overflow storage device, instead of storing the received e-mail in the user's e-mailbox.

9. The computer program product of claim 8, the steps comprising:
polling for availability of space on the subset of the overflow storage devices, wherein the availability of storage space on the overflow storage devices is indicated by results of the polling.

10. The computer program product of claim 8, the steps comprising:
polling the user's local e-mailbox for the selected overflow storage device if e-mail for the user's local mailbox is stored on the selected overflow storage device, wherein the polling of the user's e-mailbox includes:
polling for availability of space in the user's e-mailbox.

11. The computer program product of claim 9 the steps comprising:
moving e-mail to the user's local e-mailbox and removing the moved e-mail from the selected overflow storage device responsive to results of the local e-mailbox polling.

12. The computer program product of claim 8, the steps comprising:
compressing the e-mail sent for storing on the selected overflow storage device.

13. The computer program product of claim 8, the steps comprising:
computing the overflow storage device costs responsive to i) capacities of the respective overflow storage devices and ii) network logical distances between the local server and the respective remote overflow storage devices.

14. The computer program product of claim 8, the steps comprising:
charging the user a storage charge for storing the user's e-mail on the selected overflow storage device, wherein the storage charge is responsive to i) time the user's e-mail is stored on the selected overflow storage device, ii) storage space used for storing the user's e-mail on the selected overflow storage device, or both i) and ii).

15. A computer system comprising:
a processor; and
a storage device connected to the processor, wherein the storage device has stored thereon an e-mail storage management program for controlling the processor, and wherein the processor is operative with the program to execute the program for performing the steps of:
storing local capacity threshold values for a user e-mailbox hosted on a local server, including a first local capacity threshold level, a second local capacity threshold level and a maximum local capacity threshold value;
storing costs for overflow storage devices remote from the local server and accessible on a network, wherein the costs provide a ranking from a least costly to a most costly overflow storage device;
receiving an e-mail that increases the accumulated storage volume of the user's e-mails beyond the first local capacity threshold level and responsively compressing subsequent incoming e-mail subsequent to the first local capacity threshold level being exceeded;
receiving an e-mail that increases the accumulated storage volume of the user's e-mails beyond the second local capacity threshold level and responsively truncating any attachments of incoming e-mail subsequent to the second local capacity threshold level being exceeded, in addition to e-mail messages being compressed and stored;
processing e-mails of the user responsive to increases in accumulated storage volume of the e-mails beyond the respective local capacity threshold values, wherein the processing reduces storage space of the e-mails for the e-mailbox;
receiving an e-mail that increases the accumulated storage volume of the user's e-mails beyond the maximum local capacity threshold value;
selecting, by reference to the stored costs, a subset of the overflow storage devices having lesser costs than non-selected ones of the overflow storage devices;
selecting one of the overflow storage devices of the subset responsive to availability of storage space on the overflow storage devices of the subset and responsive to cost ranking among the overflow storage devices of the subset; and
sending the received e-mail for storing on the selected overflow storage device, instead of storing the received e-mail in the user's e-mailbox.

16. The computer system of claim 15, the steps comprising:
polling for availability of space on the subset of the overflow storage devices, wherein the availability of storage space on the overflow storage devices is indicated by results of the polling.

17. The computer system of claim 15, the steps comprising:
polling the user's local e-mailbox for the selected overflow storage device if e-mail for the user's local mailbox is stored on the selected overflow storage device, wherein the polling of the user's e-mailbox includes:
polling for availability of space in the user's e-mailbox.

18. The computer system of claim 16 the steps comprising:
moving e-mail to the user's local e-mailbox and removing the moved e-mail from the selected overflow storage device responsive to results of the local e-mailbox polling.

19. The computer system of claim 15, the steps comprising:
compressing the e-mail sent for storing on the selected overflow storage device.

20. The computer system of claim 15, the steps comprising:
computing the overflow storage device costs responsive to i) capacities of the respective overflow storage devices and ii) network logical distances between the local server and the respective remote overflow storage devices.

21. The computer system of claim 15, the steps comprising:
charging the user a storage charge for storing the user's e-mail on the selected overflow storage device, wherein the storage charge is responsive to i) time the user's e-mail is stored on the selected overflow storage device, ii) storage space used for storing the user's e-mail on the selected overflow storage device, or both i) and ii).

* * * * *